June 7, 1960   J. VERHOEFF   2,939,325
SHAFT-POSITIONING MECHANISM
Filed Dec. 6, 1956   3 Sheets-Sheet 1

INVENTOR
JACOB VERHOEFF
BY *Jur M. Vogel*
AGENT

June 7, 1960  J. VERHOEFF  2,939,325
SHAFT-POSITIONING MECHANISM
Filed Dec. 6, 1956  3 Sheets-Sheet 2

INVENTOR
JACOB VERHOEFF

BY
Fred M. Vogel
AGENT

United States Patent Office 2,939,325
Patented June 7, 1960

2,939,325

SHAFT-POSITIONING MECHANISM

Jacob Verhoeff, Hilversum, Netherlands, assignor, by mesne assignments, to North American Philips Company, Inc., New York, N.Y., a corporation of Delaware Filed Dec. 6, 1956, Ser. No. 626,692

Claims priority, application Netherlands Dec. 12, 1955

14 Claims. (Cl. 74—10.2)

It is known to construct a shaft-positioning mechanism for adjusting a shaft in a plurality of predetermined positions in such manner that the more or less axial displacement of a projection secured to a travelling nut, in a groove provided on one surface of the wall of a cylinder and having an adjustable abutment, determines the ultimate angular position of the shaft to be positioned. However, while upon passing from one predetermined position to another the projection with the travelling nut is first axially removed from the groove so that due to the then possible rotation of the travelling nut with respect to the wall of the cylinder the projection comes opposite the groove with the abutment determining the new position desired. The projection is then moved into the groove and against the abutment due to reversal of the direction of movement of the screw spindle. Such a positioning mechanism permits achieving a high accuracy, which is to be understood to mean that the repositioning accuracy lies within narrow limits such, for example, as 0.2°. However, in certain cases, an even higher accuracy of repositioning is required. Such is the case more particularly in wireless transmitting and receiving installations operating at short wavelength, in which a maximum accuracy with a minimum time of adjustment is desired in positioning the shafts of the capacitors. The shaft-positioning mechanism according to the invention satisfies this requirement and is characterized in that the said shaft-positioning mechanism comprises means which pre-position the shaft to be positioned in such a manner that the determined ultimate angular position of the shaft which is determined by the axial displacement of the projection against the adjustable abutment is situated within a sector of the maximum possible angle of rotation. The aforesaid sector is determined by this pre-adjustment, it being possible each time by means of other pre-adjustments to select other sectors which may or may not overlap while a retarding transmission gear is arranged between the shaft to be positioned and the screw spindle displacing the projection. The accuracy of re-adjustment is now much increased, since the ultimate adjustment is now selected in a range which is a more or less a small part of 360° and hence may be more accurate.

The construction is simpified if, in one embodiment of the invention, the sectors determined by the pre-adjustment have the same angular values.

Now, various methods may be followed for realizing the invention. In the first place, in one embodiment of the invention a second travelling nut and a second set of adjustable stops may be provided, the cooperation between a projection provided on this second travelling nut and one of the second set of adjustable stops selecting the desired sector. In other embodiments of the invention, either the second set of abutments may be provided on a surface of a second wall of a cylinder, or one wall of a cylinder may be provided and the two sets of stops are located on one surface thereof. However, the first set of stops, which thus determines the desired position of the shaft to be adjusted, is arranged in grooves on the inner surface of the wall of the cylinder, whereas the second set of stops, which determines the sector within which the desired position is situated, is arranged in grooves on the outer surface of the wall. In all three cases the second travelling nut must naturally have a screw spindle of its own, along which it can move. The last-mentioned embodiment, on the one hand, affords the advantage that not more space is occupied than is strictly necessary while on the other hand it is possible to provide a large number of grooves so as to permit selection from many positions.

In a further embodiment of the invention, the external groove, the abutment of which thus determines the position of the second projection which in itself selects the correct sector, is selected by rotation of the cylinder. It would alternatively be possible to cause the travelling nut with the associated screw spindle to rotate about the cylinder, but the said embodiment affords a simpler construction of the mechanism.

In again another embodiment of the invention, rotation of the cylinder is brought about due to a coupling being provided between the second travelling nut and the cylinder, so that rotation of this travelling nut causes stepwise rotation of the cylinder. This coupling may comprise a gear wheel, but it is alternatively possible to utilize, for example, a Maltese cross or simliar construction. It is then ensured, that the groove selected always has the correct position when the travelling nut moves downwards.

In a further embodiment of the invention the screw spindle co-acting with the first travelling nut is driven preferably electrically and between this screw spindle and the screw spindle co-acting with the second travelling nut, there is provided a coupling which becomes inoperative as soon as the projection of the first travelling nut is located in a groove containing an abutment.

It is naturally possible for the whole shaft-positioning mechanism to be adjusted manually, but preferably the whole mechanism is driven electrically, in which event, in a further embodiment of the invention, the cylinder carries a collector having as many positions as the cylinder has sector-determining grooves, which positions establish or interrupt electrical connections such that the direction of rotation of the electric motor reverses when the desired groove is reached.

Another method which may be followed in realizing the invention is that, in one embodiment of the invention, both the driven shaft and the cylinder are provided with collectors, the collector on the cylinder determining the groove containing the abutment which determines the ultimate position of the shaft, whereas the collector on the driven shaft selects the sector, in which the ultimate position is situated. Consequently, in this embodiment of the invention, a cylinder is provided having only one set of grooves, as well as only one screw spindle and travelling nut; so that the desired sector is selected solely electrically. In this case also several methods may be followed.

In one determined embodiment, the projection with the travelling nut, upon passing from one determined position into a new desired position, is first removed from the groove, whereupon the cylinder is rotated and, after the correct position has been reached, is stopped preferably by electrical means. A transmission mechanism meanwhile comprising a slipping coupling is arranged between the driving shaft and the cylinder such that after the desired position of the cylinder has been reached the driving shaft selects the desired sector in the same direction of rotation, and the direction of rotation reverses when this sector has been reached whereby the projection is again moved into the groove.

On the other hand, in another embodiment of the invention, it is possible to proceed in such a manner that, upon passing from one position into a new desired position the projection with travelling nut is first removed from the groove, means being provided for preventing axial movement of a travelling nut so that variation in the direction of rotation of the screw spindle does not result in a backward movement of the travelling nut. In another embodiment of the invention, after the projection has been removed, the cylinder may then be rotated until the correct position has been reached, which position is arrested, preferably electrically, whereupon by reversal of the direction of rotation of the driving shaft at first the correct sector and then the ultimate position of the shaft is chosen, means being provided by which, after the correct sector has been adjusted, the locking in the axial direction of the travelling nut is eliminated and a transmission mechanism comprising a slipping coupling being arranged between the driving shaft and the cylinder.

In a further embodiment of the invention, the locking means preventing the axial movement of the travelling nut comprises a number of magnets, the travelling nut having not only the projection which is moved into the groove against an abutment, but also a second projection which may be locked electrically in order to prevent rotation of the travelling nut when the magnetic locking means are interrupted. The magnetic locking means thus ensure that the travelling nut cannot displace itself in the axial direction but is capable of rotating, and the second locking means prevents rotation of the travelling nut.

In order that the invention may be readily carried into effect, several embodiments will now be described, by way of example, with reference to the accompanying drawings, in which.

Figure 1:
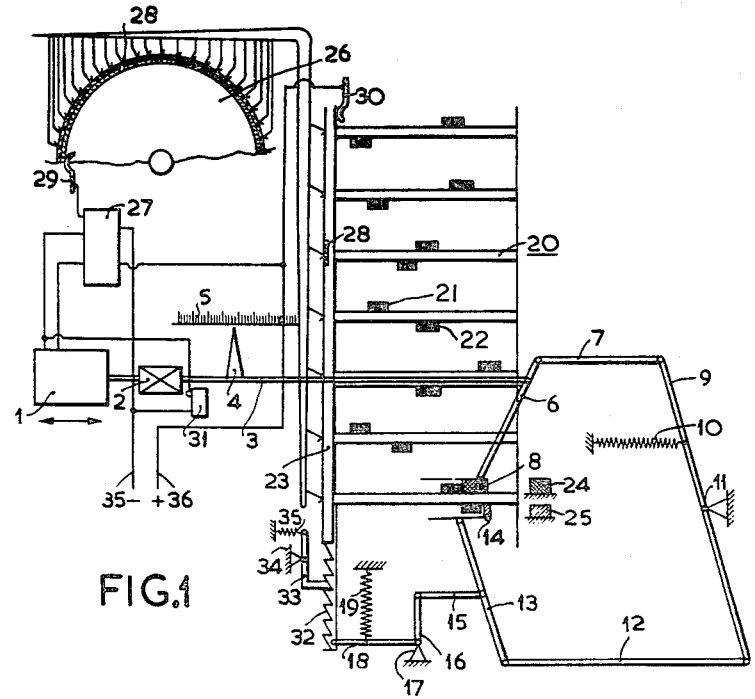
Fig. 1 shows diagrammatically one substantially mechanical embodiment of the invention.

In Fig. 1, reference numeral 1 indicates a device (actually an electric motor) which may impart a reciprocating movement to a shaft 3 coupled by means of an overload coupling 2 with the device 1. The shaft 3 has an index 4 which co-acts with a graduation 5, the shaft 3 with the index 4 being required to be adjustable in different desired positions with respect to the graduation 5. To the extremity of the shaft 3 is pivotally connected a lever 6. To one extremity of lever 6 is pivotally secured a rod 7. At its other extremity, the rod 6 has an abutment 8, which consists of a small piece of magnetic material. The rod 7 has pivotally connected to it a lever 9, which is maintained in the position shown by means of a pull spring 10 and which is pivoted at a fixed point 11. At its other extremity, the lever 9 is pivotally secured to a rod 12 and the latter, in its turn, has pivotally connected to it a lever 13, which carries a stop 14 at its other extremity. The centre of lever 13 is pivotally connected to a system of rods 15, 16. The rod 16 can pivot at a fixed point 17 and connected to rod 16 is a rod 18, which has a pull spring 19 secured to it. The rod 18 is pivotally connected to a frame 20 which each time has two adjustable abutments 21 and 22. The frame 20 may perform a downward movement and has a collector 23. Furthermore, two fixed stops 24 and 25 are provided, of which stop 24 is of magnetic material. A selecting collector 26 is shown, which is arranged outside the device proper, together with a reversing relay 27. The selecting collector 26 comprises an inner ring having a sector 28 of conductive material and a sliding contact 30. The overload coupling 2 controls a switch 31, which may be, for example of the "micro"-type. Finally frame 20 is provided with teeth 32, with which a ratchet 33 pivoted at a fixed point 34 and loaded by a spring 35 can co-operate, so that this frame can move in only one direction. A source of direct current is connected to points 36—37.

The device operates as follows:

When the index 4 is to be moved into another position with respect to the graduation 5, the collector 26 is rotated until it indicates the position desired. Consequently, a circuit extending from 36 via sliding contact 30, collector 23, sector 28, collector 26, sliding contact 29, reversing relay 27, and spring 35 is completed. The reversing relay is energized, so that the device 1 moves the shaft 3 via overload coupling 2 to the right, so that the rod 6 swings at its junction with rod 7, thus urging magnetic stop 8 against the magnetic stop 24, so that the stops 8 and 24 check one another. However, the movement of shaft 3 continues, so that now lever 9 starts to swing at the point 11. Consequently, rod 12 is moved to the left and rod 13 starts to swing at its junction with rod 15, thus urging stop 14 against stop 25. The movement of the shaft 3 is still going on, so that now rod 15 is moved to the left, whereupon rod 16 starts to swing at the fixed point 17 and rod 18 performs a downward movement, taking along the frame 20. As soon as the collector 23, which is secured to the frame 20, has reached a position corresponding to the position of collector 26, the first-mentioned circuit is interrupted, thus causing the reversing relay 27 to be de-energized. The device 1 is now supplied with current through the switch 31 which is now closed (this switch has been closed immediately, upon the beginning of the movement due to the coupling 2 becoming operative), but in the opposite direction. The rods 18, 16, 15 now cannot move, since the ratchet 33 prevents the frame 20 from moving in the opposite direction and hence upwards. The stop 14 now first moves to the new abutment 22, since the stops 8 and 24 magnetically check one another for the time being and as soon as stop 14 has engaged the new abutment 22, the rods 9, 7 and 6 are set into movement, so that stop 8 is also pushed towards the new abutment 21. When stop 8 has engaged the new abutment 21, further movement of the system of rods becomes impossible. The overload coupling 2 interrupts the connection between the device 1 and the shaft 3, so that switch 31 interrupts the current and the movement of the device 1 stops.

It is to be noted that the rod 7 has its pivot not at the centre, but that the portion connected to the rod 7 is much smaller than the portion connected to abutment 8. It is thus ensured that the first adjustment of the index 4, which determines the sector in which the ultimate position is situated, takes place first and hence is a rough pre-adjustment, while the second adjustment in this sector provides the ultimate adjustment which may be regarded as the fine adjustment. This follows from the ratios of the lengths of the rods with respect to their pivots.

Figure 3:
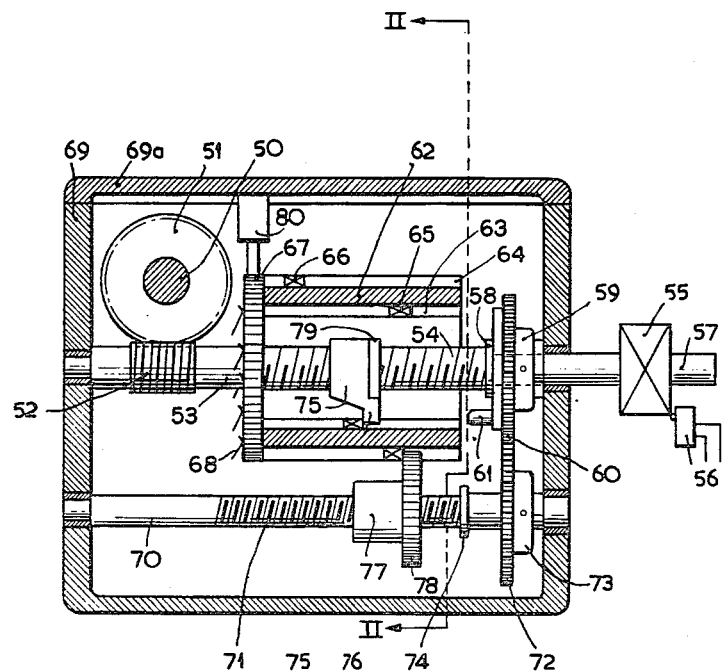
Fig. 3 shows a realization of the diagram of Fig. 1, that is to say as a section along the line I—I of Fig. 4 and viewed in the direction of the arrow.
Figure 4:
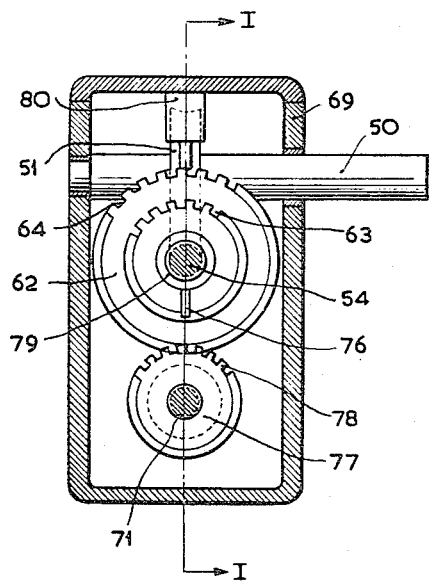
Fig. 4 is a sectional view of Fig. 3 along the line II—II, also viewed in the direction of the arrow.

One embodiment of the diagrammatic view of Fig. 1 is shown in Figs. 3 and 4, wherein 50 indicates the shaft to be positioned, on which a wormwheel 51 is fixedly secured. This wormwheel co-acts with a worm 52 positioned on a shaft 53 which also has a screw thread 54 of high pitch.

The shaft 53 is led to the exterior and there connected to an overload coupling 55 (shown diagrammatically) which co-acts with an electric switch 56. An electric motor may be connected to an input shaft 57 of the overload coupling. The overload coupling may be of the type as shown in Dutch patent application Nr. 201,768. The shaft 53 furthermore carries a gear wheel 60 between a disc 58 of magnetic material and an adjusting ring 59, which gear wheel can rotate freely about shaft 53. The gear wheel 60 also has a pin 61. A cylinder 62 can rotate freely about shaft 53 and is provided, both internally and externally with grooves 63 and 64, in which adjustable stops 65 and 66 are arranged. The cylinder 62 also carries a collector 67 which co-acts with sliding contacts 68. The shaft 53 can rotate freely in a fixed housing 69 having a cover 69a. A shaft 70 can likewise rotate freely in the housing 69 and has a screw thread 71 of low pitch. The shaft 70 also carries a gear wheel 72, which is identical with the gear wheel 60 co-operating therewith and which is fixedly secured to the shaft 70. An adjusting ring 73 and a collar 74 are likewise fixedly connected to the shaft 70. The shaft 53 carries a travelling nut 75 having a projection 76, the latter co-acting with abutment 65, while the shaft 70 carries a travelling nut 77 having projections 78. The projections 78 have the form of teeth and may co-operate with the grooves 64 of cylinder 62. The cylinder 62 may, for example, have both internally and externally 48 grooves 63 and 64 with adjustable stops 65 and 66. The travelling nut 75 has a ring of magnetic material 79. Finally an electrically controlled arresting device 80 is secured to the housing and co-operates with a gear rim provided on the outer side of collector 67.

The cylinder 62 with stops 65 and 66 is similar to the frame 20 with stops 21 and 22 as shown in Fig. 1. When the shaft 50 must be given another position, the shaft 57 starts to rotate in a direction, such that the travelling nut 75 is moved to the right so as to be screwed out of the cylinder 62. However, the traveling nut 77 remains in position, since gear wheel 60 slips on the shaft 53. As soon as the travelling nut 75 has been screwed out of cylinder 62, the magnetic portion 79 of the nut engages the rotating magnetic material 58. The nut now starts to rotate, since the projection 76 is no longer located in a groove, the pin 61 being taken along by the gear wheel 60. Now, the shaft 70 also starts to rotate and the travelling nut 77 moves to the right. When the latter has engaged collar 74, further displacement of the travelling nut is not possible and the travelling nut 77 itself starts to rotate, so that the cylinder also rotates by way of its teeth 78. This rotation is possible, since the projection 76 is no longer located in the groove 63 and the arresting device 80 is not operative yet. The cylinder 63 rotates until collector 67 has reached a pre-determined adjustment; when this adjustment has been reached, the movement of the shaft 57 reverses. Due to the locking of the cylinder by means of arresting device 80, which becomes operative upon the reversal of the direction of rotation and prevents the cylinder from rotating backwards, the travelling nut 77 cannot rotate in the other direction, so that it moves to the left until one tooth of gear wheel 78 engages the abutment 66. At this moment, shaft 50 is adjusted to the beginning of a determined sector, within which the desired position of shaft 50 is situated. Now, further rotation of shaft 70 is not possible, so that gear wheel 60 starts to slip on the shaft 53 and the traveling nut 75, against the action of the magnetic coupling 79, 58, moves to the left until the projection 76 engages the abutment 65. The shaft 50 is now adjusted in the correct position within the sector first selected and the overload coupling 55 becomes inoperative. Switch 56 is now also switched off, whereupon an electric motor driving the shaft 57 is stopped. The relay 80 may now likewise be made inoperative. This relay may be replaced, if desired, by a simple mechanical arresting device.

The retarding transmission between the worm 52 and the worm wheel 51 is illustrated in Fig. 1 by the location of the pivot on the rod 6, by which one part of the rod is many times longer than the other part. The high accuracy of re-adjustment of the device is now obtained in that a sector is selected by means of the tooth-like projections 78, which selection may be regarded as a rough adjustment, the fine adjustment proper within the selected sector being effected by the co-operation between projection 76 and abutment 65, which is transmitted with retardation by the worm wheel transmission 52—51 on shaft 50.

It is possible to provide the shaft 70 and 53 with knobs, so that they may be rotated by hand. A manual displacement of the device is thus possible, which is desirable in the fine adjustment of the various abutments; the latter may in themselves be displaced by means already known or suggested. If, desired, the teeth 78 may be replaced by a Maltese cross or a similar transmission mechanism.

Now also it is possible to omit the whole shaft 50 with all parts it carries. It is then necessary to position on the output shaft 50 a second collector which ensures that the movement of shaft 57 reverses when the correct sector has been reached. Then the embodiment is obtained as shown diagrammatically in Fig. 2.

Figure 2:
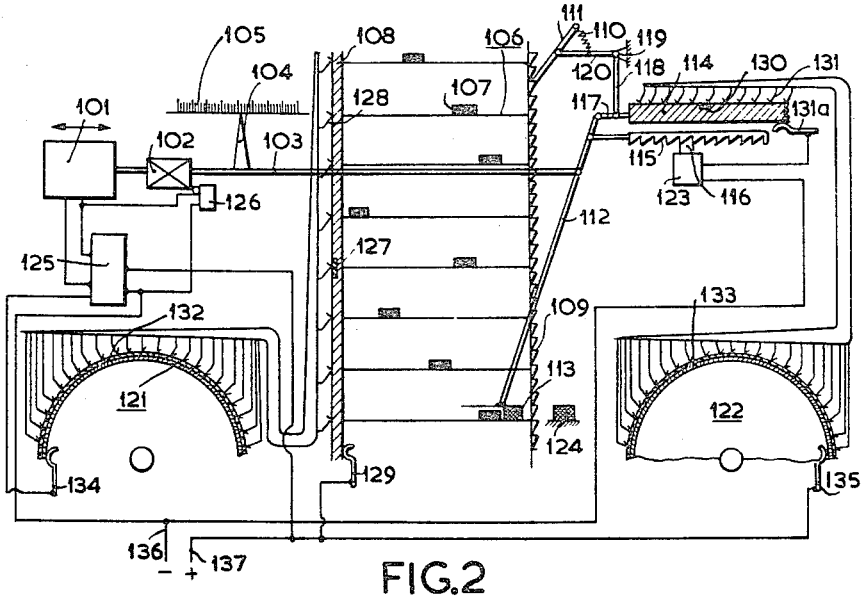
Fig. 2 shows diagrammatically one embodiment which is controlled substantially electrically.

In Fig. 2, reference numeral 101 indicates the driving device which may impart to a shaft 103 a movement to the left or to the right. The overload coupling 2 of Fig. 1 is designated 102 and the index to be adjusted with respect to the graduation 105 is indicated by 104. A frame 106 is provided which has adjustable stops 107 and is provided with a collector 108. The frame 106 also has teeth 109, which, in co-operation with a ratchet 111 loaded by a pullspring 110, permits movement of this frame in only one direction. Pivotally secured to the shaft 103 is a shaft 112, one extremity of which has an abutment 113 of magnetic material which may co-act with a fixed abutment 124 of the same material and opposite polarity, while rotatably connected to its other extremity is a collector 114, together with a toothed rod 115, with the teeth of which an electrically-controlled ratchet 116 may co-operate. Connected to a rod 117, which connects collector 114 and the extremity of rod 112, is a rod 118, which is pivotable at a fixed point 119 and to which a rod 120 which carries ratchet 111 is rigidly secured. Furthermore, two adjusting collectors 121 and 122 are provided, while a relay 123 controls the movement of ratchet 116. The figure also shows a magnetic fixed abutment 124. A reversing relay 125 and a switch 126 operated by the overload coupling 102 are provided, similarly as in Fig. 1. The collector 108 has an insulated sector 127, sliding contacts 128 and a sliding contact 129, which co-operates with the inner side of the collector. Similarly, collector 114 has an insulating sector 130, together with sliding contacts 131, and a sliding contact 131a. The two collectors 121, 122 are externally provided with insulating material, except the sectors 132, 133, which are conductive; sliding contacts 134 and 135 co-act with the conductive inner side. Finally, the poles of a direct-current source are connected at 136 and 137.

The operation of the device shown diagrammatically in Fig. 2 partly corresponds to that of Fig. 1. When a different position of the index 104 with respect to the graduation 105 is desired, the collectors 121 and 122 are moved into a position which may be read, for example, from a table and which corresponds to the position desired. Thus, at first a current circuit extending from 137 via 129, 108, 128, 132, 134 reversing relay 125 to 136 is completed. The reversing relay is energized and the device 101 moves the shaft 103 with its index 104 to the right, since the overload coupling 102 is not interrupted. The rod 103 moves the rod 112 and hence the abutment 113 is urged against the fixed stop 124, these two stops checking one other magnetically. Now, collector 114 starts to move to the right; ratchet 116 has in the meantime been drawn by a current circuit extending from 137 via 135, 133, 131, 130, 131a, 123 to 136. As collector 114 moves to the right, the toothed rod 115 together with rod 118 follow this movement, the ratchet 111 thus urging the frame 106 downwards.

For the time being let it be assumed that the insulating sectors 130 and 127 have simultaneously occupied their positions which correspond to the corresponding positions of collectors 122 and 121. The ratchet relay 123 thus becomes currentless, so that ratchet 116 meshes into the teeth of toothed rod 115, but the reversing relay 125 is not energized; the device 101 is nevertheless fed with current via switch 126, but in the reverse direction, so that now coupling 102 and shaft 103 with its index 104 move to the left. Collector 114, however, cannot move to the left, since ratchet 116 holds the toothed rod 115 in position. The frame 106 cannot move upwards, this movement being prevented by ratchet 111. The only movement possible is that of rod 112, so that stop 113 disengages from stop 124 and is urged against abutment 107. Then shaft 103 cannot move further and coupling 102 is disconnected and switch 126 is opened, so that device 101 is switched off and stops.

As previously mentioned, it has been assumed that collectors 121 and 122 assume their positions simultaneously but in practice this occurs rarely if ever. It is now assumed that collector 114 first assumes its position. The ratchet 116 then meshes into toothed rod 115, but the movement of collector 114 to the right can continue, since the shape of the teeth on 115 makes this possible.

Ratchet 116 is then released, since sector 130 is now beyond its correct position. As soon as the position of frame 106 electrically corresponds to the position selected by collector 121, the movement of shaft 103 reverses in the described manner, but the stops 113 and 124 are (for the time being) magnetically held together, so that at first collector 114 moves to the left until it reaches the position selected by collector 122. Then ratchet 116 becomes operative. At this moment, the index 104 to be adjusted has reached the beginning of a sector of the total adjustment range and the desired position is situated within this sector. This position is now reached by the movement of abutment 113, which movement interrupts the coupling with stop 124, which hitherto has been maintained magnetically, and urges stop 113 against one of the adjustable abutments 107, whereupon the ultimate adjustment is reached due to the device 101 being switched off. At this time coupling 102 is disconnected and hence switch 126 is opened.

However, it is alternatively possible that frame 106 with its collector 108 assumes its position first, while collector 114 has not yet reached its position. Then the direction of movement of shaft 103 reverses while sector 130 still has to cover a certain path to the right. The collector 114 then nevertheless moves to the left, but it must be taken into consideration that actually collector 114 rotates. It then rotates through an angle such that sector 130 approaches sliding contact 131 from the left; ratchet 116 then becomes operative and the correct adjustment may take place. In this case also, the correct sector is chosen and shaft 103 together with its index 104 is moved into this position by the possible movement of selector 114. The possible movement of rod 112 determines the ultimate position.

It will be evident that in the diagrammatic Figure 2 as shown and discussed, there is a certain relationship between the spacing of the teeth 109 on the frame 106, the lengths of the rods 120, 118 and the other dimensions, for example, of collector 114, the length of the teeth on gear rod 115, the length of sector 130, in order to ensure that there is a certain relationship between the possible movement of collector 114 and frame 106.

In this case also, similarly, as in Fig. 1, the high accuracy of re-adjustment and the accuracy in general is obtained due to the portion of rod 112 located between rod 103 and stop 113 being many times larger than the remaining portion of rod 112. The beginning of the sector is determined (approximately) by ratchet 116 together with toothed rod 115. Any errors occurring in determining the ultimate position of index 104 with respect to graduation 105 due to the contact of stop 113 with abutment 107 are transmitted on a greatly reduced scale.

Figure 5:
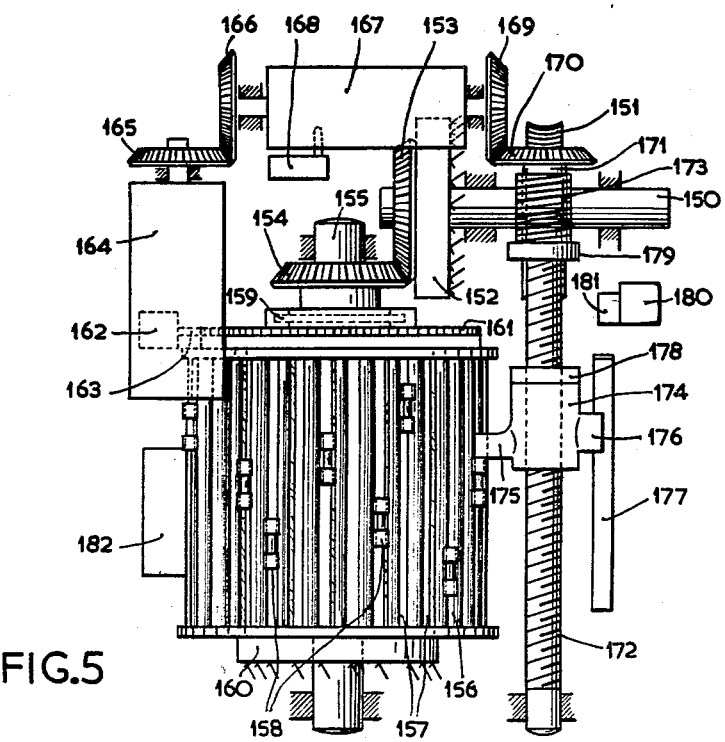
Fig. 5 shows a realization of the diagram of Fig. 2, shown in elevation.
Figure 6:
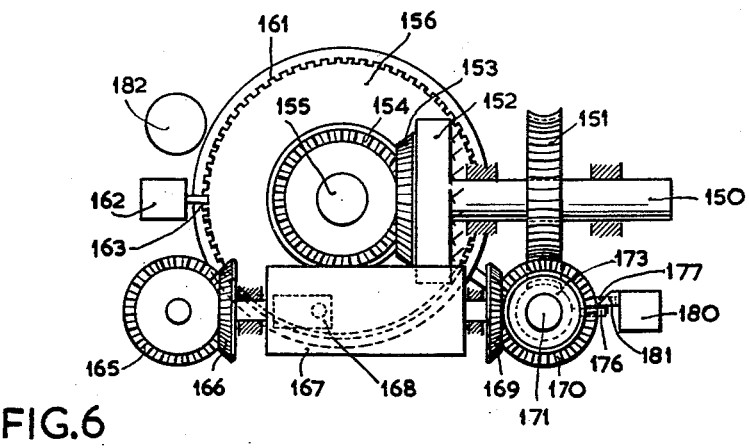
Fig. 6 is a plan view of Fig. 5.

In a practical embodiment of the diagram of Fig. 2 according to Figs. 5 and 6, a shaft to be adjusted is indicated by the reference numeral 150. This shaft carries a worm wheel 151, a collector 152 and a conical gear wheel 153. Co-acting with gear wheel 153 is a similar gear wheel 154, which is rigidly connected to a shaft 155. This shaft also carries a cylindrical drum 156, which is externally provided with grooves 157 and stops 158. These stops are adjustable in known manner (not shown), for example, by means of screw spindles. The cylinder preferably comprises screw spindles and abutments as suggested in Dutch patent application Nr. 201,459. The drum 156 can rotate freely about the shaft 155 and is coupled with the conical gear wheel via a slight friction coupling 159 (shown diagrammatically). The drum also comprises a collector 160, which is rigidly connected thereto. The upper side of the drum has a gearing 161, with which a ratchet 163 controlled by an electric relay 162 cooperates.

An electric motor 164 drives via gear wheels 165, 166 an overload coupling 167 which co-acts with a switch 168. The output of the overload coupling is coupled by means of gear wheels 169, 170 with a shaft 171 having screw thread 172 of high pitch. The shaft 171 has a worm 173 which co-acts with worm wheel 151. The screw thread 171 co-acts with a travelling nut 174, one side of which is provided with a projection 175. This projection may co-act with one of the abutments 158. The other side of travelling nut 174, but not diametrically with respect to projection 175, is provided with a projection 176. The latter may co-act with a fixed stop 177, so that rotation of the travelling nut is prevented when shaft 171 rotates in one predetermined direction. Said rotation is prevented at any rate when the projection 175 is located in one of the grooves of cylinder 156. However, when the projection has been moved out of the groove due to rotation of the threaded shaft 171, stop 177 for the time being prevents rotation until projection 176 has also been disengaged from stop 177. The travelling nut 174 has a ring of magnetic material 178, another magnetic ring 179 being arranged under the worm 173 on the shaft 171. The rings have opposite polarities. A resilient ratchet 181 having a bevelled extremity, which ratchet is controlled by relay 180, may also be brought into cooperation with projection 176, so that rotation in one direction is prevented. Finally, a reversing relay 182 is provided, which determines the direction of rotation of the electric motor 164.

The operation of the described device may best be understood in combination with the diagrammatic illustration of Fig. 2. When the shaft 150 is to be adjusted in another position, this position is chosen either only on collector 121, or on both collectors. The electric motor then starts to rotate in a direction such that the travelling nut 174 is screwed upwards. The ratchet 163 is withdrawn. The cylinder, however, is at rest, since projection 175 is still in a groove and the slight friction coupling 159 slips. As soon as the travelling nut with its projection 175 has been released from the groove, in the first place the magnetic coupling between the two rings 178 and 179 becomes operative. The travelling nut starts to rotate, ratchet 181 having also been withdrawn by the relay, since collector 152 rotates, even if collector 122 has not changed its position. Furthermore, cylinder 156 can now freely rotate, so that collector 160 also rotates. As soon as this collector has reached the position determined by the manually adjusted collector 121, the reversing relay 182 is de-energized and the direction of rotation of the motor reverses. Furthermore, ratchet 163 becomes operative, so that the cylinder cannot rotate in the reverse direction. Now, the shaft 150 has reached the beginning of a sector, in which the desired position is situated. The collector 152 now determines the moment when relay 180 makes ratchet 181 operative. When this takes place, the travelling nut can no longer rotate and the magnetic coupling 178, 179 is disconnected, so that the travelling nut on the shaft 171 with its screw thread 172 moves downwards. The projection now enters the groove determined by collector 160 and moves downwards until an abutment 158 prevents further movement. Now the coupling 167 is made inoperative and switch 168 is opened, so that the mechanism comes to rest.

It is obvious that the embodiment shown in Figs. 5 and 6 does not correspond in every respect to the diagram shown in Fig. 2. Fundamentally, however, they are identical and what has been said about the various possibilities of adjustment of the collectors also applies to the embodiment shown in Figs. 5 and 6.

It is possible to omit relay 162 and ratchet 163 and to arrange instead a freewheel coupling between cylinder 156 and a fixed point, since the cylinder always rotates in one direction. However, for correct fixation of the cylinder, a ratchet is preferable, the more so as a circuit is already interrupted when the correct position of the cylinder is reached.

The ratio of transmission between worm wheel 151 and worm 173 is determined by the pitch of the screw thread 172 and the number of the contacts co-operating with collector 152 and then also by the angular value of the insulating sector on this collector. If there are 36 sliding contacts and hence a sector which is at most a little smaller than 10° (two sliding contacts must never be in contact with the insulating sector simultaneously) the transmission ratio may be 36, if the pitch of the screw thread 172 has also been so chosen that upon almost 10° rotation of shaft 150 the nut 174 can move from its upper position to its lowest possible position. An almost 10° rotation of shaft 150 implies an almost complete revolution of shaft 171 with the above-mentioned figures. With almost one complete revolution of cylinder 156, the travelling nut, which is then checked magnetically, performs almost 36 revolutions and the distance between relay 180 and the upper side of the guide 177 must then be such that the projection 175 can pass between both of them. It may then occur that the collector 152 in this direction of rotation de-energizes the relay once and hence ratchet 181 is released. However, as previously mentioned, this ratchet is bevelled in one direction and furthermore resilient, so that this causes no difficulty.

In a shaft-positioning mechanism realized as shown in Figs. 5 and 6, the collector 152 and 36 sliding contacts and the cylinder 156 and 48 grooves with stops. The collector 160 thus also had 48 sliding contacts. Consequently, 48 positions of the shaft to be adjusted are possible. From the description of the operation of the mechanism it follows that the 48 positions need not be distributed regularly over 360°; the ultimate position of the shaft solely depends upon the position of the abutment. The collector 152 solely determines the moment (that is the boundary of a sector) when the travelling nut starts its downward movement, which means the beginning of the fine adjustment of shaft 150. It is even possible for all of the 48 possible positions to be situated within one sector, that is within 10° with the said data.

The correct position is always reached in the same direction of movement and since the wall 173 remains subject to a directional force, when the overload coupling 167 becomes inoperative, any backlash is always eliminated in the same direction, while due to the high ratio of transmission between worm 173 and the worm wheel 151 provided on the shaft to be adjusted, any residual inaccuracies are transmitted on a greatly reduced scale.

The coupling suggested in Dutch patent application No. 201,768 is particularly suitable to serve as the overload coupling 167, since the input and output shafts of this coupling may be arranged in line with one another in a simple manner.

What is claimed is:

1. A shaft-positioning mechanism for positioning a shaft in a multiplicity of preset positions comprising a casing, a first shaft operatively connected to said shaft to be positioned and journalled in said casing and at least a portion thereof being screw-threaded, means for reversibly rotating said first shaft, a travelling nut provided with a projection on said screw-threaded portion of the first shaft, a cylinder mounted on and rotating freely about said first shaft, said cylinder being provided with a plurality of grooves, a plurality of adjustable stops in said grooves, said travelling nut in one selected position of said shaft having said projection in one of said grooves and in engagement with one of said adjustable stops, said travelling nut being retracted from said one of the grooves by the movement of said travelling nut on the rotating screw-threaded portion of the first shaft upon selecting another preset position, means causing said travelling nut to rotate about said first shaft when said travelling nut is removed from said cylinder and positioned opposite the selected groove with the selected adjustable stop therein whereby when the direction of rotation of said first shaft is reversed said travelling nut is screwed back into the selected groove and in engagement with said selected adjustable stop and whereby said shaft to be positioned is located in the selected position, and means connected to said first shaft for pre-positioning said shaft to be positioned in a sector of the maximum possible angle of rotation of the selected position thereof.

2. A shaft-positioning mechanism as claimed in claim 1 wherein the sectors determined by the pre-positioning of the shaft to be positioned have the same angular value.

3. A shaft-positioning mechanism for positioning a shaft in a multiplicity of preset positions comprising a casing, a first shaft operatively connected to said shaft to be positioned and journalled in said casing and at least a portion thereof being screw-threaded, means for reversibly rotating said first shaft, a travelling nut provided with a projection on said screw-threaded portion of the first shaft, a cylinder mounted on and rotating freely about said first shaft, said cylinder being provided with a plurality of grooves, a plurality of adjustable stops in said grooves, said travelling nut in one selected position of said shaft having said projection in one of said grooves and in engagement with one of said adjustable stops, said travelling nut being retracted from said one of the grooves by the movement of said travelling nut on the rotating screw-threaded portion of the first shaft upon selecting another preset position, means causing said travelling nut to rotate about said first shaft when said travelling nut is removed from said cylinder and positioned opposite the selected groove with the selected adjustable stop therein whereby when the direction of rotation of said first shaft is reversed said travelling nut is screwed back into the selected groove and in engagement with said selected adjustable stop and whereby said shaft to be positioned is located in the selected position, a second shaft journalled in said casing and being provided with a screw-threaded portion of said second shaft for pre-positioning said shaft to be positioned in a sector of the maximum possible angle of rotation of the selected position thereof, the projection on said second travelling nut engaging another of said adjustable stops in order to pre-position said shaft to be positioned.

4. A shaft-positioning mechanism as claimed in claim 3 wherein the other adjustable stops are provided in a plurality of grooves located in the outer periphery of said cylinder.

5. A shaft-positioning mechanism as claimed in claim 3 wherein all of said adjustable stops are located in grooves arranged on one surface of said cylinder.

6. A shaft-positioning mechanism for positioning a shaft in a multiplicity of preset positions comprising a casing, a first shaft operatively connected to said shaft to be positioned and journalled in said casing and at least a portion thereof being screw-threaded, means for reversibly rotating said first shaft, a travelling nut provided with a projection on said screw-threaded portion of the first shaft, a cylinder mounted on and rotating freely about said first shaft, said cylinder being provided with a first set of grooves in the inner periphery thereof and a second set of grooves in the outer periphery thereof, a plurality of adjustable stops in said grooves, said travelling nut in one selected position of said shaft having said projection in one of said grooves and in engagement with one of said adjustable stops, said travelling nut being retracted from said one of the grooves by the movement of said travelling nut on the rotating screw-threaded portion of the first shaft upon selecting another preset position, means causing said travelling nut to rotate about said first shaft when said travelling nut is removed from said cylinder and positioned opposite the selected groove in the first set of grooves with the selected adjustable stop wherein whereby when the direction of rotation of said first shaft is reversed said travelling nut is screwed back into the selected groove and in engagement with said selected adjustable stop and whereby said shaft to be positioned is located in the selected position, a second shaft journalled in said casing and being provided with a screw-threaded portion, and a second travelling nut provided with a projection on said screw-threaded portion of said second shaft for pre-positioning said shaft to be positioned in a sector of the maximum possible angle of rotation of the selected position thereof, the projection on said second travelling nut engaging another of said adjustable stops in one of the grooves of the second set of grooves in order to pre-position said shaft to be positioned.

7. A shaft-positioning mechanism as claimed in claim 6 wherein the cylinder is rotated in order to bring the projection of said second travelling nut into engagement with the selected adjustable stop in one of the grooves of the outer periphery of said cylinder.

8. A shaft-positioning mechanism as claimed in claim 3 further comprising a coupling provided between said second travelling nut and said cylinder whereby the rotation of said second travelling nut causes the stepwise rotation of said cylinder.

9. A shaft-positioning mechanism as claimed in claim 3 further comprising electrical means for driving said first shaft and a coupling between said first shaft and second shaft which becomes inoperative as soon as the projection on said first travelling nut is located in the selected groove with an adjustable stop therein.

10. A shaft-positioning mechanism for positioning a shaft in a multiplicity of preset positions comprising a casing, a first shaft operatively connected to said shaft to be positioned and journalled in said casing and at least a portion thereof being screw-threaded, an electric motor for reversibly rotating said first shaft, a traveling nut provided with a projection on said screw-threaded portion of the first shaft, a cylinder mounted on and rotating freely about said first shaft, said cylinder being provided with a plurality of grooves, a plurality of adjustable stops in said grooves, said travelling nut in one selected position of said shaft having said projection in one of said grooves and in engagement with one of said adjustable stops, said travelling nut being retracted from said one of the grooves by the movement of said travelling nut on the rotating screw-threaded portion of said first shaft upon selecting another preset position, means causing said travelling nut to rotate about said first shaft when said travelling is removed from said cylinder and positioned opposite the selected groove with the selected adjustable stop therein whereby when the direction of rotation of said first shaft is reversed said travelling nut is screwed back into the selected groove and in engagement with said selected adjustable stop and whereby said shaft to be positioned is located in the selected position, a second shaft journaled in said casing and being provided with a screw-threaded portion of said second shaft for pre-positioning said shaft to be positioned in a sector of the maximum possible angle of rotation of the selected position thereof, the projection on said second travelling nut engaging another of said adjustable stops in order to pre-position said shaft to be positioned, a collector ring mounted on said cylinder having the same number of connections as sector-determining grooves in said cylinder, said connections when made causing the direction of rotation of said electric motor to reverse.

11. A shaft-positioning mechanism as claimed in claim 3 further comprising at least two collectors in said casing, one of said collectors secured to said cylinder and determining the selected groove containing the adjustable stop which determines the ultimate position of the shaft to be positioned, and a collector mounted on said shaft to be positioned which determines the sector in which the ultimate position is located.

12. A shaft-positioning mechanism as claimed in claim 3 further comprising a transmission mechanism including a slipping coupling arranged between said first shaft and second shaft whereby after the desired position of the cylinder has been reached, said first shaft selects the desired sector in the same direction of rotation and after this sector has been reached the direction of rotation reverses whereby the projection on said first travelling nut is screwed back into the selected groove and in engagement with the adjustable stop therein.

13. A shaft-positioning mechanism as claimed in claim 12 further comprising locking means for preventing axial movement of said travelling nuts whereby backward movement of said travelling nuts are prevented when there is a change in direction of rotation of said first shaft.

14. A shaft-positioning mechanism as claimed in claim 13 further comprising abutments connected to said slipping coupling and magnetic material provided on the travelling nuts and on said abutments.

References Cited in the file of this patent

UNITED STATES PATENTS

| | | |
|---|---|---|
| 2,834,216 | Thompson | May 13, 1958 |
| 2,837,925 | Rowley et al. | June 10, 1958 |
| 2,837,929 | Crooke | June 10, 1958 |